(12) United States Patent
Meddock (10) Patent No.: US 12,534,915 B2
(45) Date of Patent: Jan. 27, 2026

(54) HEMP-BASED ROOF SHINGLE

(71) Applicant: Brian Meddock, Boise, ID (US)

(72) Inventor: Brian Meddock, Boise, ID (US)

( * ) Notice: Subject to any disclaimer, the term of this patent is extended or adjusted under 35 U.S.C. 154(b) by 941 days.

(21) Appl. No.: 17/734,140

(22) Filed: May 2, 2022

(65) Prior Publication Data

US 2023/0119319 A1  Apr. 20, 2023

Related U.S. Application Data

(60) Provisional application No. 63/257,666, filed on Oct. 20, 2021.

(51) Int. Cl.
*E04D 1/16* (2006.01)
*E04D 1/20* (2006.01)
*E04D 1/22* (2006.01)

(52) U.S. Cl.
CPC ............. *E04D 1/20* (2013.01); *E04D 1/16* (2013.01); *E04D 1/22* (2013.01)

(58) Field of Classification Search
None
See application file for complete search history.

(56) References Cited

U.S. PATENT DOCUMENTS

| | | | | |
|---|---|---|---|---|
| 5,958,130 A * | 9/1999 | Stroeml | ............... | C04B 28/02 |
| | | | | 106/653 |
| 6,159,879 A * | 12/2000 | Hesch | ............... | B27N 3/14 |
| | | | | 428/326 |
| 6,841,231 B1 * | 1/2005 | Liang | ............... | C08L 97/02 |
| | | | | 428/296.7 |
| 7,407,615 B2 * | 8/2008 | Hohn | ............... | C04B 28/04 |
| | | | | 106/738 |
| 2002/0040557 A1 * | 4/2002 | Felton | ............... | E04D 13/002 |
| | | | | 52/316 |
| 2013/0344279 A1 * | 12/2013 | Doshi | ............... | D04H 1/413 |
| | | | | 427/372.2 |
| 2018/0215664 A1 * | 8/2018 | Robinson | ............... | E04C 2/284 |

FOREIGN PATENT DOCUMENTS

| | | | | |
|---|---|---|---|---|
| DE | 19735846 A1 * | 2/1999 | ............ | C04B 28/001 |
| DE | 20311928 U1 * | 10/2003 | ............ | E04B 1/90 |
| FR | 2798376 A1 * | 3/2001 | ............ | C04B 18/24 |

OTHER PUBLICATIONS

"FR2798376_Machine Translation" is a machine translation of FR-2798376-A1. (Year: 2001).*

(Continued)

*Primary Examiner* — Larissa Rowe Emrich
(74) *Attorney, Agent, or Firm* — Brennan, Manna & Diamond, LLC (57) ABSTRACT

A bio-composite construction material for use as a substrate for a tile, a shingle, or a building panel. The bio-composite construction material may be formed into a rigid or semi-flexible member. A hemp fiber component is mixed with a binding agent to create the bio-composite construction material. The rigid member utilizes hemp hurd fibers mixed with lime or clay and water to form a tile structure. The semi-flexible member utilizes hemp primary bast fibers to form an elongated structure that is flexible. Hemp lignin or a resin is used as the binding agent and the primary bast fibers may be woven or alternately layered to create a substrate for a roof shingle.

8 Claims, 6 Drawing Sheets

(56) References Cited

OTHER PUBLICATIONS

Forde, Mike. (2009). <i>ICE Manual of Construction Materials, vol. 2—Metals and Alloys; Polymers; Polymer Fibre Composites in Civil Engineering; Appendices—72.4 Hemp-Lime Building.</i> (pp. 842). ICE Publishing. Retrieved from <br>https://app.knovel.com/ (Year: 2009).*

"DE20311928_Machine Translation" is a machine translation of DE-20311928-U1. (Year: 2003).*

M. Andzs, J. Gravitis, and A. Veveris, "Extraction of Lignin from Hemp Shives", ETR, vol. 1, pp. 103-105, Aug. 2015, doi: 10.17770/etr2013vol1.798. (Year: 2015).*

"DE19735846_Machine Translation" is a machine translation of DE-19735846-A1 (Year: 1999).*

\* cited by examiner

HEMP-BASED ROOF SHINGLE

CROSS-REFERENCE TO RELATED APPLICATION

The present application claims priority to, and the benefit of, U.S. Provisional Application No. 63/257,666, which was filed on Oct. 20, 2021 and is incorporated herein by reference in its entirety.

FIELD OF THE INVENTION

The present invention generally relates to an improved construction component, and more specifically to a hemp-based product usable as a building material. Accordingly, the present specification makes specific reference thereto. However, it is to be appreciated that aspects of the present invention are also equally amenable to other like applications, devices, and methods of manufacture.

BACKGROUND

Standard shingles and tiles can put a strain on the environment due to excessive use of wood and other materials. People may be looking for more environmentally friendly and renewable materials to construct housing. Natural materials can be processed using multiple manufacturing processes to suit the demands of each building product category including exterior resins, colors, and varying the usage and orientation and the materials.

Hemp is an eco-friendly and durable alternative to plywood, drywall, concrete, and other building material. Hemp is a fast-growing, natural, and sustainable crop. It is a relatively easy plant to grow organically without herbicides or pesticides. Hemp (*Cannabis sativa*) is considered to have one of the most productive farmable fibers, generating up to 25 tons of construction-grade hurd fiber per acre.

Hemp has course outer bast fibers and a shorter finer hurd fibers on the inside. These hemp plant fibers can be manufactured into a variety of products that resemble wood, plastic, and even concrete like material. Hemp is used to make a variety of commercial and industrial products, including rope, textiles, clothing, shoes, food, paper, bioplastics, insulation, and biofuel. The bast fibers can be used to make textiles that are 100% hemp, but they are commonly blended with other fibers, such as flax, cotton or silk, as well as virgin and recycled polyester, to make woven fabrics for apparel and furnishings. The inner two fibers of the plant are woodier and typically have industrial applications, such as mulch, animal bedding, and litter.

Building materials, called building composites, can be used for both exterior and interior uses. Fiberboards, cement, paint, paneling, plywood, spray-on insulation, concrete pipes, and roofing shingles all can be made from composite materials, just to name a few. Replacing building materials mined from the earth or harvested from centuries old forests with renewable natural materials is extremely beneficial. Hemp fibers are lighter and stronger than standard composite lumber.

Accordingly, there is a great need for a new renewable natural building material. There is also a need for a way for a product usable in place of conventional shingles or tiles, offering a more environmentally friendly option. Similarly, there is a need for a building product to designed to reduce dependency on oil used in fiberglass or asphalt shingles. There is also a need for a product that eliminates the need for asphalt-based products for roof shingles or tiles. Further, there is a need for a new construction material that can easily integrate UV and fire-resistant materials in the final product to maximize safety for the home.

In this manner, the improved construction material of the present invention accomplishes all of the forgoing objectives, thereby providing an easy solution for replacing less environmentally friendly building products. A primary feature of the present invention is a hemp-based shingle used in place of conventional shingles or tiles. The present invention allows the construction industry to reduce dependency on oil used in fiberglass or asphalt shingles by using hemp as a base substrate in the building material. Finally, the improved construction panels and tiles of the present invention are capable of incorporating existing safety materials in the final product.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a bio-composite construction material. The bio-composite construction material is formulated for use as a building substrate for use as a tile, a shingle, or a panel. The bio-composite construction material may be formulated to be rigid or semi-flexible. A hemp fiber component is mixed a binding agent to form the bio-composite construction material.

The bio-composite construction material may be used for a rigid, formed bio-composite construction substrate. The rigid, formed bio-composite construction substrate comprises a hemp fiber component, a binding agent, and a solvent. The hemp fiber component, the binding agent, and the solvent are mixed and combined to form the rigid, formed bio-composite construction substrate. The bio-composite construction substrate is then pressed or injection-molded into a rigid member for use in construction.

The hemp fiber component comprises a plurality of hemp hurd fibers. The plurality of hemp hurd fibers are shorter hemp fibers typically approximately 0.5 millimeters in length. The binding agent may be lime or clay. The solvent may be water. A percentage of the binding agent used is determined by a size of the hemp fibers and is higher in percentage when the hemp fibers are smaller having a greater surface area. The bio-composite construction material may further comprise a plurality of additional additives.

The bio-composite construction material may also be used for a semi-flexible bio-composite construction substrate. The semi-flexible bio-composite construction substrate comprises a hemp fiber component and a binding agent. The hemp fiber component and the binding agent are mixed or amalgamated together to form the semi-flexible bio-composite construction substrate. The semi-flexible bio-composite construction substrate is then used as substrate for a shingle or other semi-flexible building member.

The hemp fiber component comprises a plurality of hemp primary bast fibers. The plurality of hemp primary bast fibers are longer hemp fibers typically between approximately five and 40 millimeters in length. The plurality of hemp primary bast fibers are then amalgamated into a plurality of fiber bundles between approximately one and five meters in length. The binding agent may be a hemp lignin or other organic resin polymer. The plurality of fiber bundles are oriented substantially parallel to a longitudinal axis of the shingle or semi-flexible building member. The bio-composite construction material may further comprise a plurality of additional additives.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention, in one exemplary embodiment, is a hemp-based shingle, tile, or other building component used in place of conventional shingles or tiles on a roof or in a building. The construction products are made using hemp as a base substrate to reduce oil dependency in the construction of fiberglass and asphalt shingles and tiles. The finished products may emulate an architectural, cedar shake or roof tile.

The hemp building material may include an elongate structure having a plurality of bast fibers contained within the elongate structure. The bast fibers are orientated substantially parallel to the longitudinal axis of the elongate structure. Due to its composition and layout, the construction panel provides all of the advantages of natural materials and high end roofing materials, particularly an attractive appearance, while at the same time allowing for ease of installation, little or no maintenance requirements, and providing superior impact and fire resistance when compared to other roofing materials.

Industrial hemp stalks contain two key types of natural fibers: bast and hurd. Bast fibers are long, elongated, and string-like and found on the outer portions of hemp stalks. Bast refers to the phloem, or tissue that grows along the stems or trunks of plants. Bast can be extracted from the inner barks of some trees, vines, and plants, such as hemp, nettle, and flax. The fibers are traditionally separated from the other plant material through a process called retting. Bast fibers gives the plant its tensile strength. The natural high-tensile strength of the bast fibers contribute to the impact-resistant of the final products utilizing these fibers.

Conversely, hurd fibers resemble wood chips in their structure and are found in the interior of hemp stalks. Hurds fibers typically make up approximately 70% of the usable fibers found in industrial hemp but are often considered a waste product. As such, hemp hurd product manufacturing not only allows producers to commoditize byproducts, but also lessens the amount of agricultural waste coming from hemp farms.

Referring initially to the drawings, FIGS. 1-6 illustrate a bio-composite construction material. The bio-composite construction material is formulated for use as a building substrate for use as a tile, a shingle, or a panel. The bio-composite construction material is formulated for use as a primary structural component in these products. The bio-composite construction material may be formulated to be rigid or semi-flexible. A hemp fiber component is mixed a binding agent to form the bio-composite construction material.

The hemp fiber component may comprise a plurality of hemp primary bast fibers, a plurality of hemp hurd fibers, or a combination thereof. The hemp primary bast fibers are desirable to create more flexible end products. The hemp hurd fibers are desirable to create more rigid, formed end building products. The binding agent for use with the hemp hurd fibers may be lime, clay, concrete, or any similar binding agent. The binding agent for use with the hemp primary bast fibers may be lignin or any similar organic polymer or resin.

Hemp fiber is advantageous because of the length of the fibers. The primary bast fibers in the bark are typically approximately between five and 40 millimeters in length. They are amalgamated in fiber bundles typically approximately between one and five meters in length. In comparison, secondary bast fibers are approximately two millimeters in length. The woody core fibers or hurd are shorter and approximately 0.55 millimeters in length. The hurd fibers are cemented together with considerable lignin. The core fibers are generally considered too short for high-grade paper applications where a length of three millimeters is considered ideal, and too much lignin is present. The longer bast fibers more ideal for that application.

Lignin is a highly abundant bio-polymeric material that constitutes cellulose one of major component in cell wall of woody plants. Lignin has a large complex chemical structure, ideal for providing additional functionality such as filler, reinforcing agent, compatibilizer, stabilizer, etc. Lignin has potential industrial uses as a binder for particleboard and similar laminated or composite wood products, as a soil conditioner, as a filler or an active ingredient of phenolic resins, and as an adhesive for linoleum. Lignocellulose biopolymers strengthen the cell wall of plants using cellulose and hemicellulose to form a framework in which lignin is incorporated as a kind of connector, thus solidifying the cell wall. In contrast to fossil petroleum, lignocelluloses are derived from renewable raw materials, such as hemp. They can be grown on fields and in forests and are generally climate neutral. Lignin, which represents up to 30 percent of the lignocellulose biomass is a resinous substance consists of phenylpropanoid aromatic basic building blocks.

Hemp bio-composites have many potential applications. Unlike hemp bio-plastics which mainly consist of polymers derived from the cellulose of the plant, bio-composites are comprised of a resin or polymer combined with the outer bast fibers to reduce weight and increase strength of end products. Hemp bio-composites may be used for roof tiles, drainage systems, sinks, and baths and may be the future of sustainable, carbon negative hemp houses.

Figure 1:
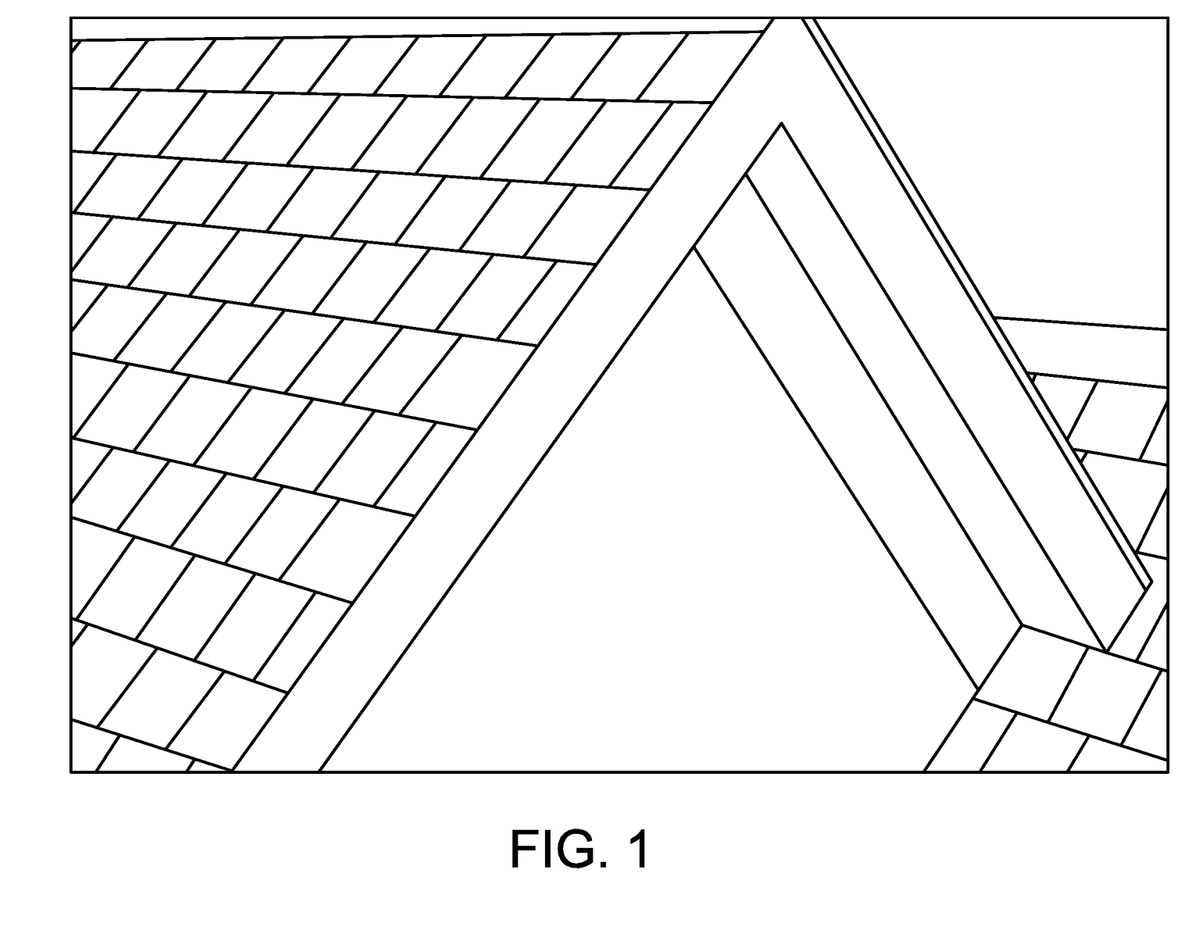
FIG. 1 illustrates a perspective view of one potential embodiment of a bio-composite construction material substrate of the present invention used to create shingles to protect a roof in accordance with the disclosed architecture.
Figure 2:
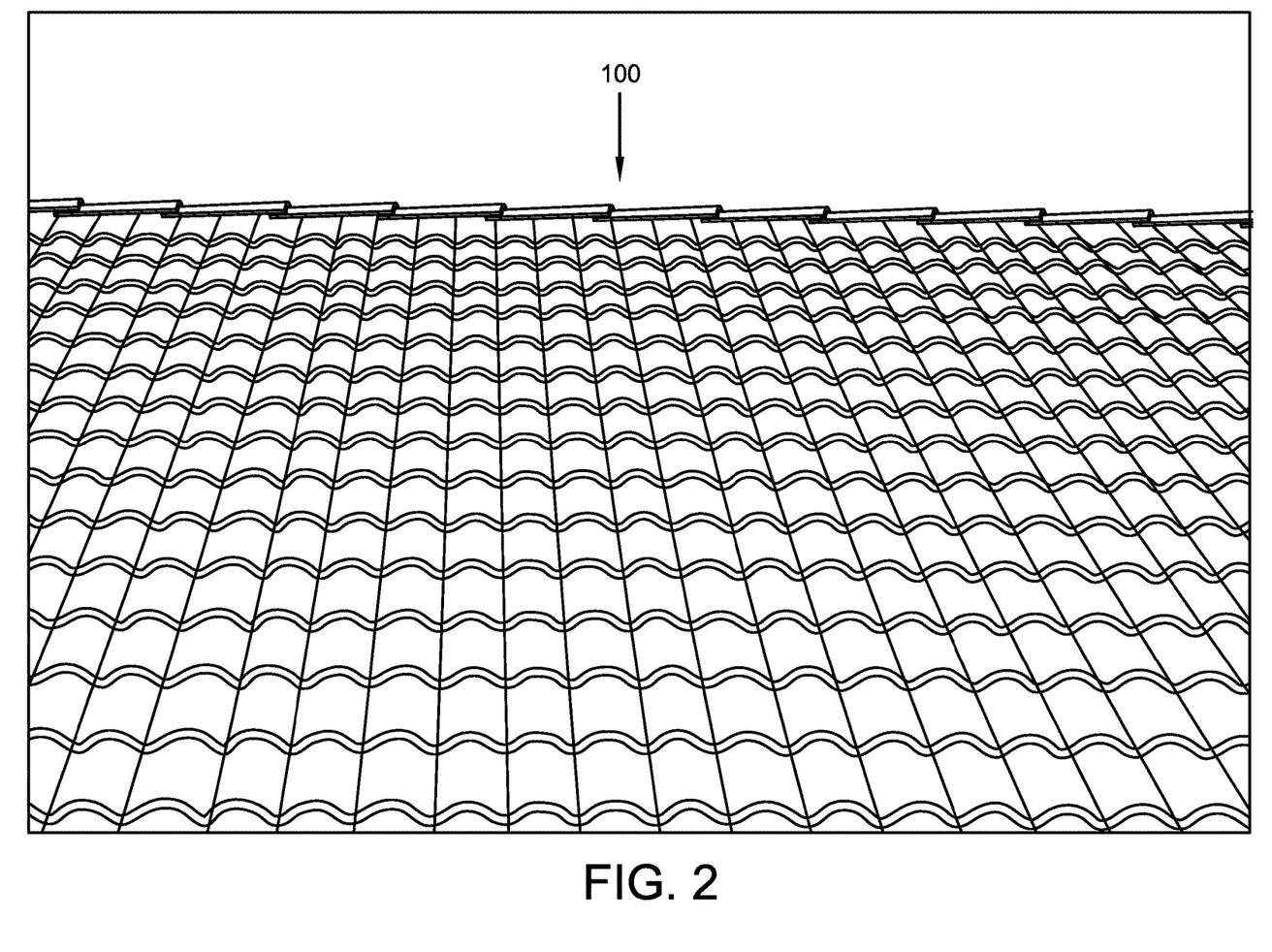
FIG. 2 illustrates a perspective view of one potential embodiment of a rigid, formed bio-composite construction substrate of the present invention formed into a plurality of roof tiles in accordance with the disclosed architecture.
Figure 3:
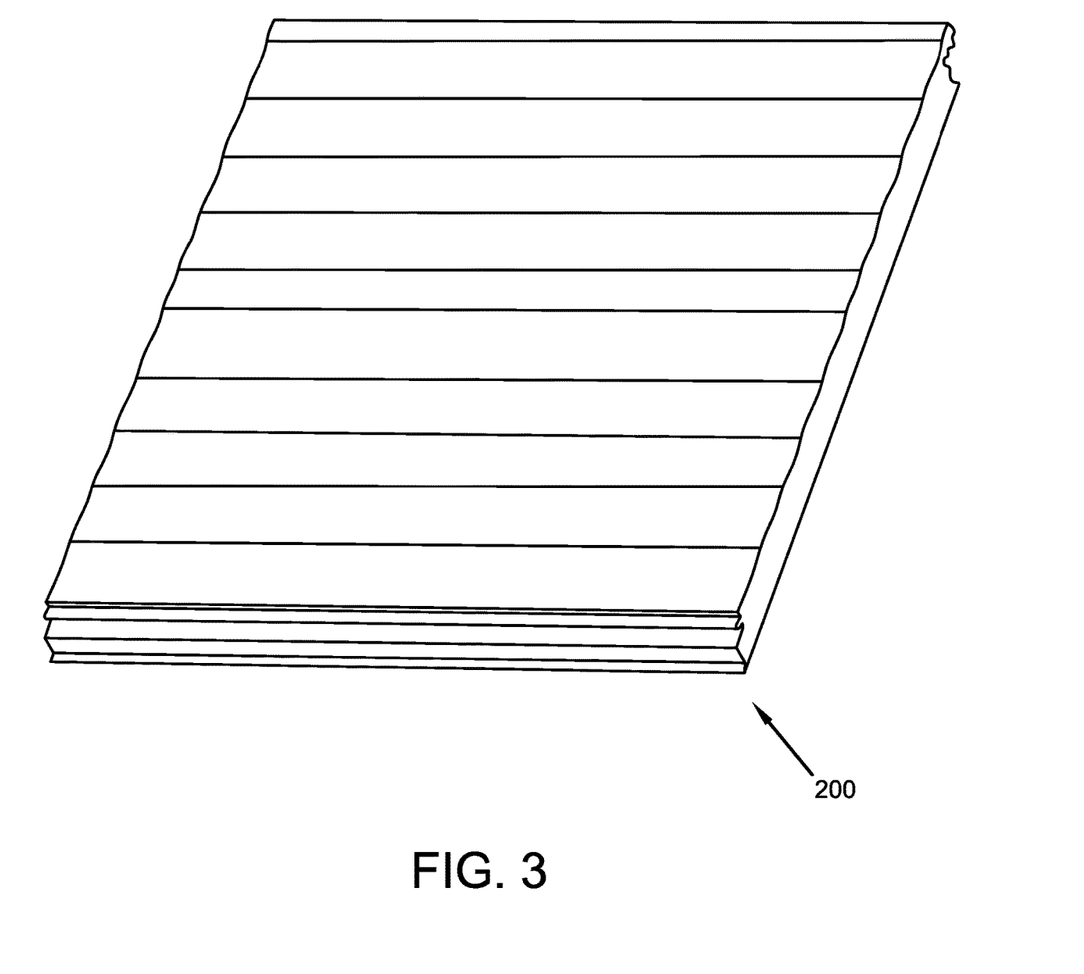
FIG. 3 illustrates a perspective view of one potential embodiment of the rigid, formed bio-composite construction substrate of the present invention formed into a building panel in accordance with the disclosed architecture.

As illustrated in FIG. 2, the bio-composite construction material may be used for a rigid, formed bio-composite construction substrate. The rigid, formed bio-composite construction substrate comprises a hemp fiber component, a binding agent, and a solvent. The hemp fiber component, the binding agent, and the solvent are mixed and combined to form the paste-like bio-composite construction substrate. The bio-composite construction substrate is then pressed or injection-molded into a rigid member, such as a tile 100 or a construction panel 200 as illustrated in FIG. 3, for use in construction. The tile 100 or construction panel 200 may be formed in any desired style usable in roofing construction or siding, such as lap-siding, shakes, etc.

The hemp fiber component comprises a plurality of hemp hurd fibers. The plurality of hemp hurd fibers are shorter hemp fibers typically approximately between 0.5 and 0.6 millimeters in length. The binding agent may be lime, hydrated lime, clay, concrete, or any similar binding agent. The solvent may be water. A percentage of the binding agent is determined by a size of the hemp fibers. Generally, the percentage of the binding agent used is higher percentage when the hemp fibers are smaller having a greater surface area.

The rigid, formed bio-composite construction substrate may further comprise a plurality of additional additives. The additives may comprise fire-retardant agents, UV-resistant agents, biocidal agents, fungicidal agents, or the like. The rigid, formed bio-composite construction substrate may further comprise a coloring agent. Varying rigid, formed bio-composite construction substrates will have differing ratios of the binding agent, the coloring agent, and respective hemp fiber material.

Figure 4:
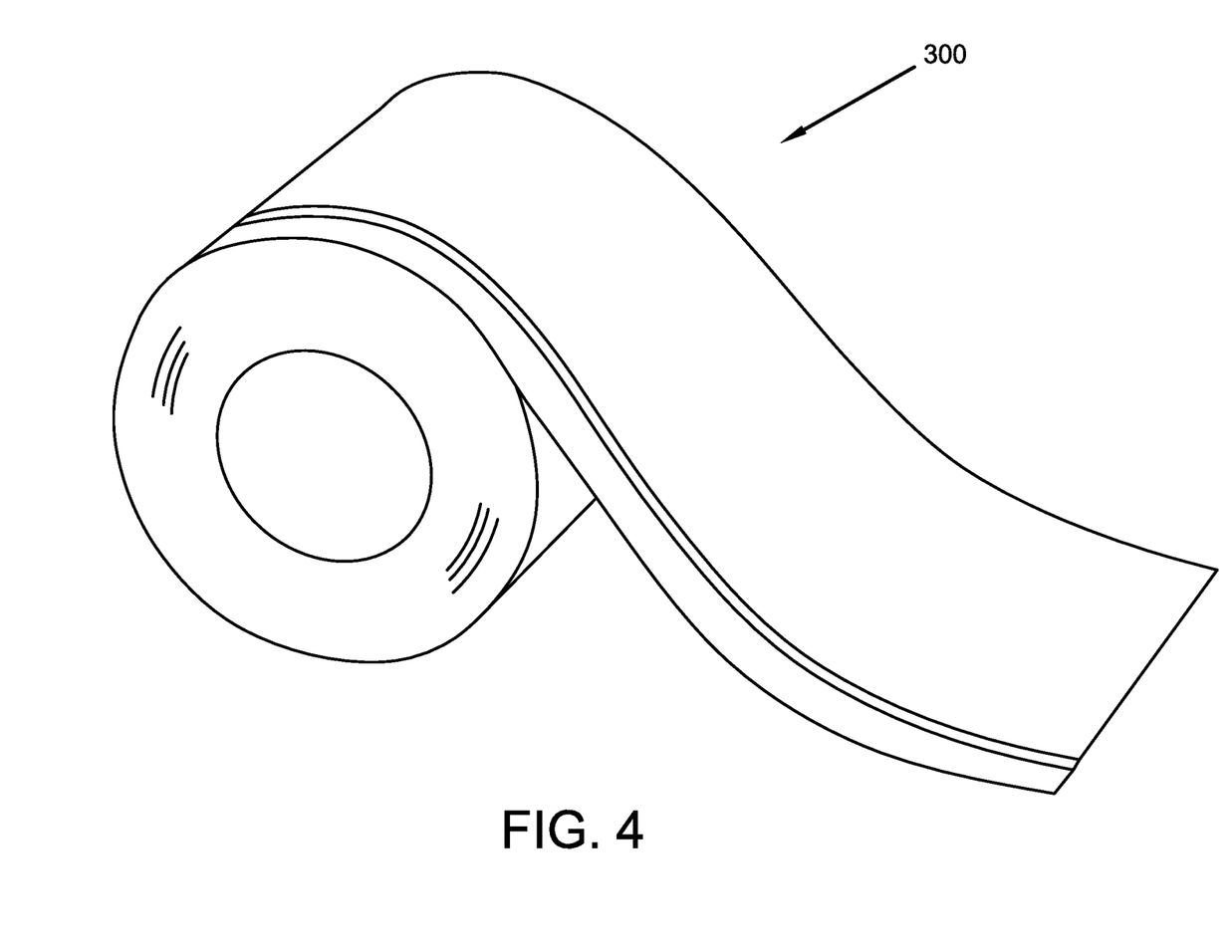
FIG. 4 illustrates one potential embodiment of a semi-flexible bio-composite construction member substrate of the present invention formed into a roll of roofing material substrate in accordance with the disclosed architecture.
Figure 5:
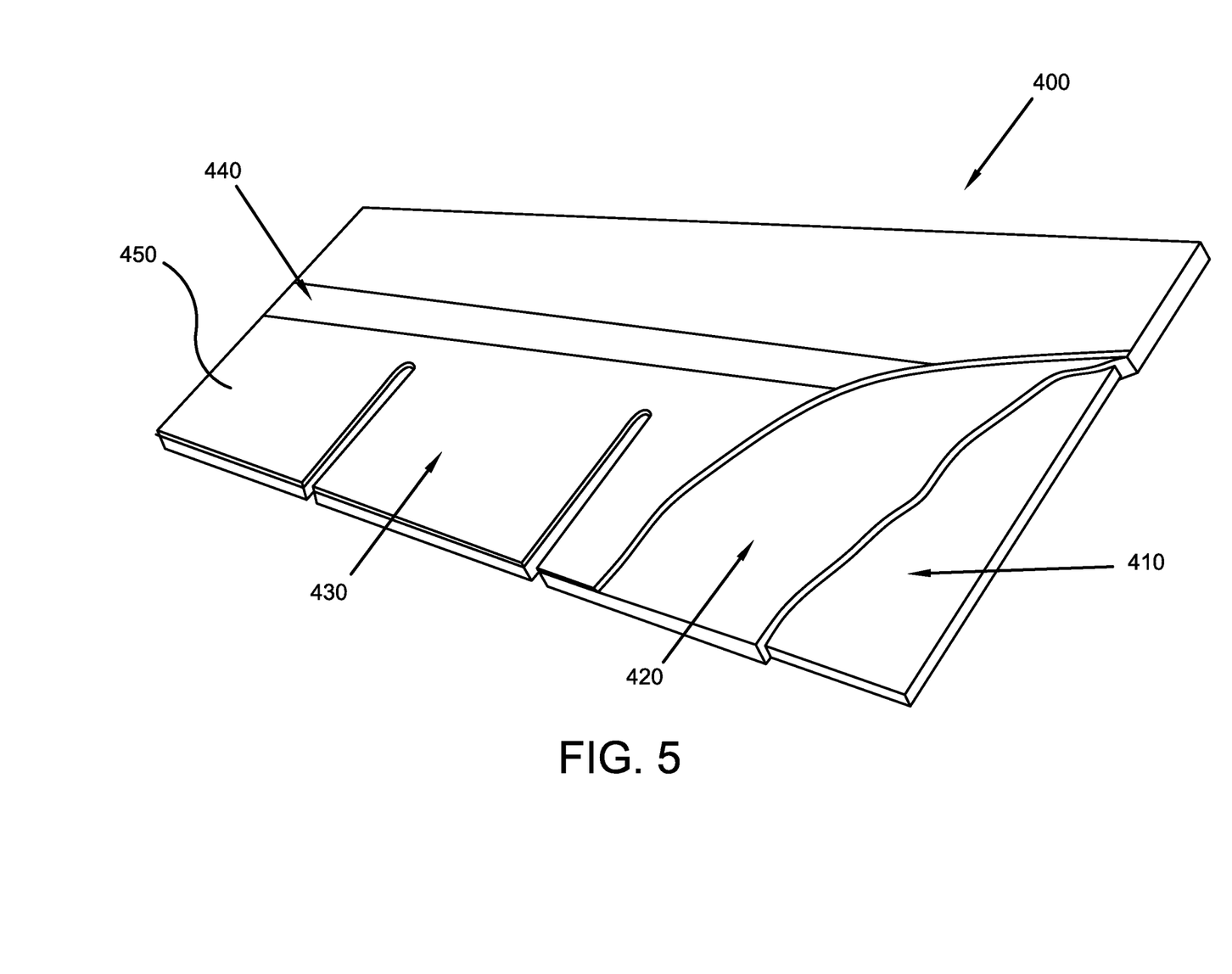
FIG. 5 illustrates a cut away view of one potential embodiment of the semi-flexible bio-composite construction member substrate of the present invention formed into a roof shingle in accordance with the disclosed architecture.
Figure 6:
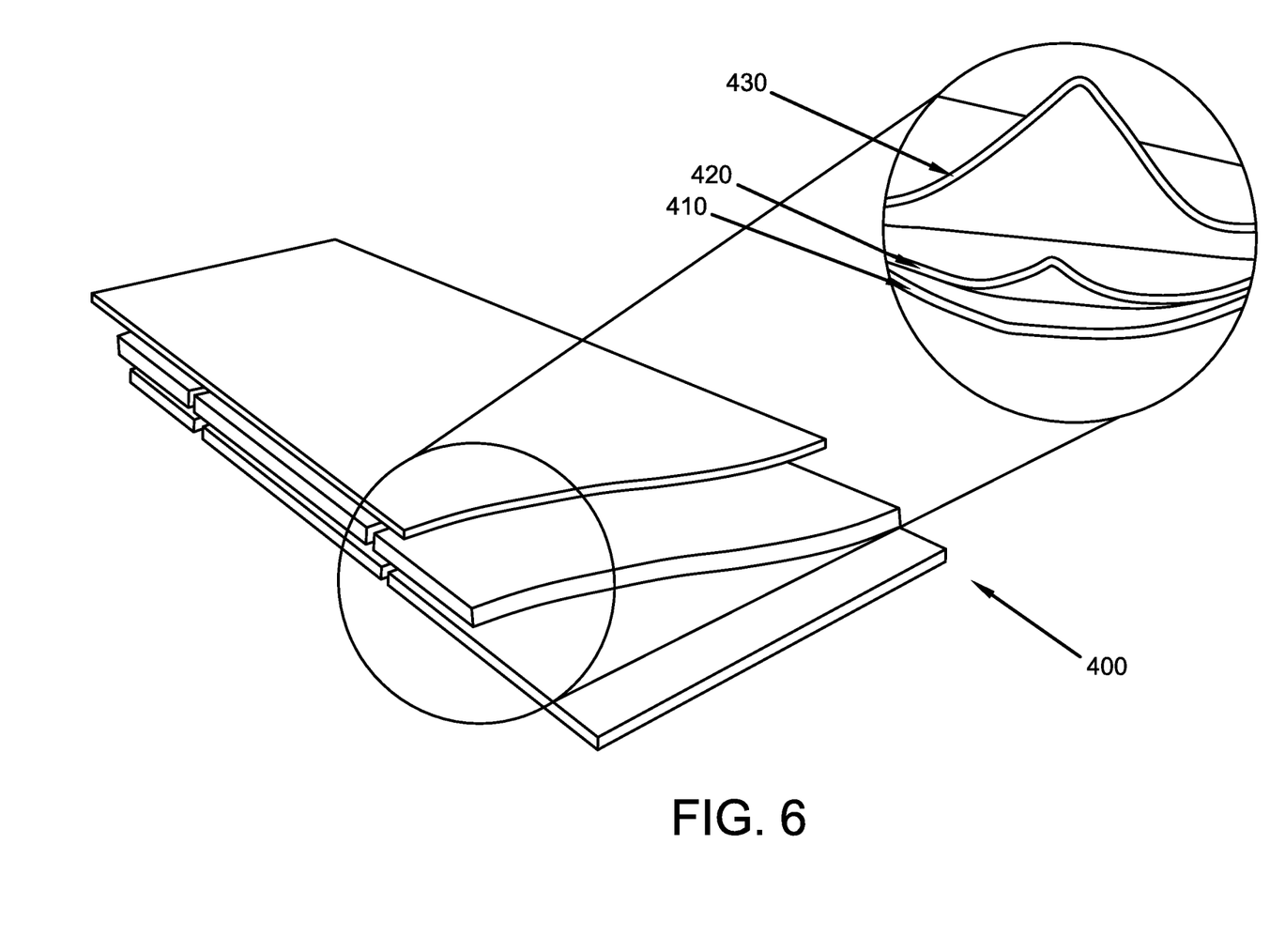
FIG. 6 illustrates a closeup exploded view of one potential embodiment of the semi-flexible bio-composite construction member substrate of the present invention formed into the roof shingle in accordance with the disclosed architecture.

As illustrated in FIGS. 4-6, the bio-composite construction material may also be used for a semi-flexible bio-composite construction substrate. The semi-flexible bio-composite construction substrate comprises a hemp fiber component and a binding agent. The hemp fiber component and the binding agent are mixed or amalgamated together to form the semi-flexible bio-composite construction substrate. The semi-flexible bio-composite construction substrate is then used as substrate for a shingle or semi-flexible building member. The shingles may be laminated architectural modular sheet shingles, three-tab shingles material 400 as illustrated in FIG. 5, or roll shingle material 300 as illustrated in FIG. 4.

The hemp fiber component comprises a plurality of hemp primary bast fibers. The plurality of hemp primary bast fibers are longer hemp fibers typically between approximately five and 40 millimeters in length. The plurality of hemp primary bast fibers are then amalgamated into a plurality of fiber bundles approximately between one and five meters in length. The binding agent may be a hemp lignin or other organic resin polymer. The plurality of fiber bundles are oriented substantially parallel to a longitudinal axis or length of the shingle or semi-flexible building member. The plurality of fiber bundles may be built up in layers to increase a thickness of the semi-flexible bio-composite construction substrate.

Modular sheet shingles require semi-flexibility and additional tensile strength. This would be accomplished in the present invention with the utilization of the elongated bast fibers of the hemp plant, which by nature run parallel to the longitudinal axis of the plant. This trait provides a high tensile strength when woven or alternately layered to the desired final product thickness.

The semi-flexible bio-composite construction substrate may comprise a plurality of additional additives. The additives may comprise fire-retardant agents, UV-resistant agents, biocidal agents, fungicidal agents, or the like. The semi-flexible bio-composite construction substrate may further comprise one or more coloring agents.

In one embodiment, the semi-flexible bio-composite construction substrate is used to form a roofing shingle 400 as illustrated in FIGS. 5 and 6. The roofing shingle 400 comprises a base 410 and a substrate 420. The base 410, the substrate 420, or both may be manufactured from the semi-flexible bio-composite construction substrate. Alternatively, one of the base 410 or the substrate 420 may be manufactured from a traditional shingle material, such as fiberglass, glass fiber melt, organic felt, asphalt, or the like. The roofing shingle 400 may further comprise a granular top layer 430 and a sealing strip 440. The roofing shingle 400 may be formed with a plurality of tabs 450.

Notwithstanding the forgoing, the roof tile 100, building panel 200, flexible roll 300, or shingle 400 constructed from the bio-composite construction material can be any suitable size, shape, and configuration as is known in the art without affecting the overall concept of the invention, provided that it accomplishes the above stated objectives. One of ordinary skill in the art will appreciate that the shape and size of the roof tile 100, building panel 200, flexible roll 300, or shingle 400 and their various components, as show in the FIGS. are for illustrative purposes only, and that many other shapes and sizes of the roof tile 100, building panel 200, flexible roll 300, or shingle 400 are well within the scope of the present disclosure. Although dimensions of the roof tile 100, building panel 200, flexible roll 300, or shingle 400 and their components (i.e., length, width, and height) are important design parameters for good performance, the roof tile 100, building panel 200, flexible roll 300, or shingle 400 and their various components may be any shape or size that ensures optimal performance during use and/or that suits user need and/or preference. As such, the roof tile 100, building panel 200, flexible roll 300, or shingle 400 may be comprised of sizing/shaping that is appropriate and specific in regard to whatever the roof tile 100, building panel 200, flexible roll 300, or shingle 400 is designed to be applied.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A bio-composite construction material comprising:
   a hemp fiber component;
   a binding agent; and
   a biocidal agent; and
   wherein the hemp fiber component is mixed with the binding agent to form a building substrate for a tile, a shingle, or a panel; and
   wherein the hemp fiber component comprises a plurality of hemp primary bast fibers of between 5 and 40 millimeters in length and a plurality of hemp hurd fibers of between 0.5 and 0.6 millimeters in length.

2. The bio-composite construction material of claim 1, wherein the binding agent is hemp lignin.

3. A semi-flexible bio-composite construction member comprising:
   a hemp fiber component;
   a concrete binding agent;
   a fungicidal agent; and
   a fiberglass base; and
   wherein the hemp fiber component is mixed with the binding agent and formed into a semi-flexible substrate member.

4. The semi-flexible bio-composite construction member of claim 3, wherein the hemp fiber component comprises a plurality of hemp primary bast fibers.

5. The semi-flexible bio-composite construction member of claim 4, wherein the plurality of hemp primary bast fibers are between 5 and 40 millimeters in length.

6. The semi-flexible bio-composite construction member of claim 5, wherein the plurality of hemp primary bast fibers are amalgamated into a plurality of fiber bundles between 1 and 5 meters in length.

7. The semi-flexible bio-composite construction member of claim 3 further comprising a coloring agent.

8. The semi-flexible bio-composite construction member of claim 3 further comprising a fire-retardant agent and a UV resistant additive.

* * * * *